United States Patent
Bright

(10) Patent No.: US 10,660,310 B2
(45) Date of Patent: May 26, 2020

(54) PET GROOMING TOOL

(71) Applicant: William Bright, San Diego, CA (US)

(72) Inventor: William Bright, San Diego, CA (US)

( * ) Notice: Subject to any disclaimer, the term of this patent is extended or adjusted under 35 U.S.C. 154(b) by 183 days.

(21) Appl. No.: 15/716,384

(22) Filed: Sep. 26, 2017

(65) Prior Publication Data

US 2019/0090454 A1 Mar. 28, 2019

(51) Int. Cl.
*A01K 13/00* (2006.01)
*B26B 13/12* (2006.01)
*B26B 13/06* (2006.01)

(52) U.S. Cl.
CPC ............ *A01K 13/002* (2013.01); *B26B 13/06* (2013.01); *B26B 13/12* (2013.01)

(58) Field of Classification Search
CPC ...... A01K 13/00; A01K 13/002; B26B 13/06; B26B 13/12; B26B 13/285; B26B 11/00; B26B 11/001; B26B 11/005; B26B 11/006
USPC .................. 119/600, 601, 611, 612, 613, 617
See application file for complete search history.

(56) References Cited

U.S. PATENT DOCUMENTS

| | | | | |
|---|---|---|---|---|
| 852,547 | A * | 5/1907 | Finegan | A01K 13/002 119/613 |
| 2,961,996 | A | 1/1960 | Oliver | |
| 4,970,990 | A * | 11/1990 | Wilhelmi | A01K 13/002 119/601 |
| 9,301,500 | B1 * | 4/2016 | Murphy | A01K 13/002 |
| 2006/0251462 | A1 * | 11/2006 | Hoadley | A46B 7/023 401/123 |
| 2006/0266379 | A1 * | 11/2006 | Shelton | A45D 24/10 132/333 |
| 2008/0115735 | A1 * | 5/2008 | Wang | A01K 13/002 119/614 |
| 2008/0229587 | A1 * | 9/2008 | Dennis | B26B 13/24 30/195 |
| 2009/0025647 | A1 * | 1/2009 | Bashore | A01K 13/00 119/601 |
| 2012/0017843 | A1 * | 1/2012 | Fernandez | A01K 13/002 119/600 |
| 2014/0026821 | A1 * | 1/2014 | Tu | A01K 13/002 119/600 |

FOREIGN PATENT DOCUMENTS

WO WO-2013059854 A1 * 5/2013 ............ A01K 13/00

* cited by examiner

*Primary Examiner* — Christopher D Hutchens
(74) *Attorney, Agent, or Firm* — Morrison & Foerster LLP

(57) ABSTRACT

Provided are methods and apparatus for addressing mats and tangles in the fur of mammals. Specifically, provided herein is a doubled-bladed tool for mat and tangle-splitting that reduces or eliminates the pain and stress experienced by the animal during grooming.

15 Claims, 4 Drawing Sheets

PET GROOMING TOOL

FIELD

This disclosure generally relates to a tool for grooming an animal, more specifically to a doubled-bladed tool for mat and tangle splitting, and uses thereof.

BACKGROUND

Pet animals such as dogs, cats, and rabbits, especially those having long hair or fur, can develop mats and tangles in their hair or fur. If the coat of an animal is not properly and frequently brushed, loose and live hair become tangled and embedded in large masses which develop into mats.

Mats are solid clumps of knotted fur and can be found anywhere on the body of the animal. They can form in both the outer coat as well as the deeper undercoat of an animal's fur. Sometimes, severe mats form in the undercoat and are unnoticeable because of the heavy outer coat. In many cases, mats can be combed or brushed out; however, it is difficult to do so without hurting the animal. Severe matting can be extremely painful to the animal during brushing or combing.

To minimize the pain experienced by the animals, tools are sometimes used to remove the mats from the coat of the animal. A variety of pet grooming tools are commercially available for grooming pets and removing tangled and matted fur or hair. Examples include grooming brushes, combs, rakes, and clippers. However, the process of removing mats and tangles can be laborious and can create great pain and stress for the animal. Additionally, mat removal often leaves unsightly holes in the coat of the animal.

An effective way to cut through a mat or tangle is to target each individual mat or tangle by slicing down the middle of the mass. For instance, a commercially available tool comprising a single blade, as described in U.S. Pat. No. 2,961,996, is used by inserting the single blade directly into the center of the mat and slicing the tangled fur. However, a single bladed tool requires an opposing force to hold the fur against the blade for the cutting action, usually accomplished by pulling or tugging on the fur which causes stress and discomfort for the animal. In addition, a single bladed tool has an exposed cutting surface which may result in accidental cutting of the user or animal, especially if the animal is uncooperative or moving. Additionally, the blade of this tool dulls easily and may be difficult to sharpen or may be difficult to replace.

SUMMARY

Provided herein is an animal grooming tool comprising a handle having a proximal end and a distal end; a neck having a handle end and a blade end; and first and second blades each having a tip, a base, and an edge with a shearing surface, wherein the first and second blades are joined together at their respective bases such that the shearing surfaces facing one another to form a V-shape, wherein the base of the first and second blades are attached to the blade end of the neck, wherein the handle end of the neck is attached to the distal end of the handle, and wherein the first and second blades, the neck, and the handle are positioned such that the blades extend from base to tip in the same general direction as the distal end to the proximal end of the handle.

As an exemplary advantage, the grooming tool described herein can reduce or eliminate the pain and stress experienced by the animal during grooming by reducing the need for pulling on or tugging on the fur to generate forces to stabilize the fur against the cutting surface. The doubled bladed tool described herein provides double the slicing surface area to improve the cutting action. Additionally, the two blades are arranged in a 'V' shape with respect to each other and so may automatically catch the fur in a single gliding action that does not require the user to pull or tug on the animal. The neck allows the tool to curve inwards, such that the handle, neck, and blades form a half circle, for example. The blades are oriented such that the blades extend from base to tip in the same general direction as the distal end to the proximal end of the handle. This positioning of the blades may allow for increased safety and ease of use. Since the tips of the blades are not pointed outwards and away from the direction of the handle, this may reduce accidental stabbing of the pet or user. The directionality of the blades allows the user to slice through mats and tangles by pulling the tool in a downward motion that is similar to the motion used in brushing the fur of the pet. This increases the safety of the tool since it allows blades to glide through the fur or hair of the animal with the tips moving downward and outward in the direction of the fur. In the presently described tool, the blades can be sharpened as frequently as necessary with a common sharpener, such as one that is used to sharpen scissors to avoid trapping the animal's fur on the blade without cutting the fur off. As another exemplary advantage, the grooming tool described herein provides for increased safety, since the two shearing surfaces face each other which reduces the risk of a blade cutting the animal or groomer.

In some embodiments, the first blade is unitary with the neck. In some embodiments, the neck is curved in a concave direction. In some embodiments, the tips of the first and second blades are rounded. In some embodiments, the first and second blades each have a convex edge. In some embodiments, the first and second blades are fastened together to prevent relative movement when either of the blades slice through matted fur or hair.

In some embodiments, the first and second blades can be sharpened. In some embodiments, the first and second blades are positioned at an angle that is less than 90 degrees relative to one another.

In some embodiments, the handle is unitary with the neck.

In some embodiments, the first and second blades are each between about 1.5 and about 2.5 inches in length. In some embodiments, the neck has an arc length of greater than about 2 inches. In some embodiments, the handle is between about 4 inches and about 10 inches in length. In some embodiments, the proximal end of the handle extends at least about 2 inches beyond the tips of the first and second blades.

In some embodiments, the tool additionally includes an attached pin brush. In some embodiments, the pin brush can be swiveled.

In some embodiments, the tool is made of steel or stainless steel.

Provided in some embodiments are methods of grooming an animal having at least a partially matted coat with one or more mats or tangles using a tool of any of the embodiments described herein, the method including: locating the one or more mats or tangles; slicing the one or more mats or tangles by moving the tool in a direction generally parallel to the natural flow of the fur in the matted or tangled section; and combing the remaining hair.

In some embodiments of any of the methods described herein, the mat or tangle to be removed is received between the first and second blades of the tool.

In some embodiments, the slicing step comprises contacting both shearing surfaces of the first and second blades with the mat or tangle.

In some embodiments, contacting both shearing surfaces of the first and second blades with the mat or tangle in the slicing step creates substantially less pulling force than contacting the shearing surface of only one blade.

In some embodiments, the animal is a dog, a cat, or a rabbit.

DETAILED DESCRIPTION

Figure 1:
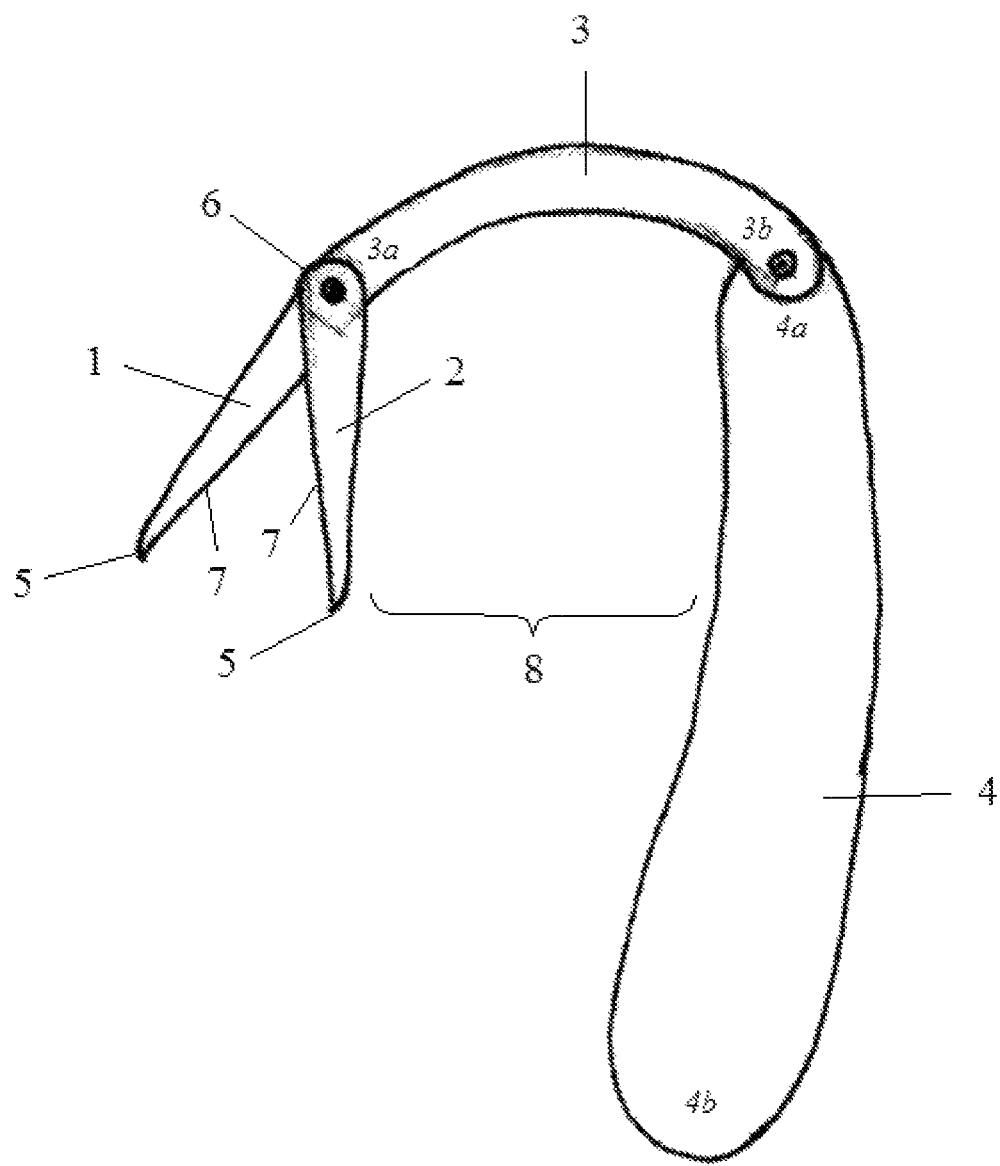
FIG. 1 provides a schematic representation of a side view of an exemplary embodiment of a grooming tool (e.g., mat and tangle splitting tool).

FIG. 1 represents an embodiment of a grooming tool shown from a side view. The grooming tool includes two blades 1 and 2 which are attached to a neck 3 and a handle 4. The blades 1 and 2 each have a tip 5, a base 6, and an edge 7 with a shearing surface. The neck 4 includes a blade end 3a and a handle end 3b. The handle includes a distal end 4a and a proximal end 4b.

The blades 1 and 2 are joined together at their respective bases such that the shearing surfaces face one another to form a V-shape. The blades 1 and 2 are positioned such that they are parallel to the direction of cutting. In some embodiments, the tips of the blades 1 and 2 are blunted, for example by rounding the end, for safety. In some embodiments, the blades 1 and 2 each have a convex edge and are positioned at an angle that is less than 90 degrees relative to one another.

The blades 1 and 2 are joined by their bases 6 to the blade end 3a of the neck. In some embodiments, blade 1 is unitary with the neck. The distal end of the handle 4a is joined to the handle end 3b of the neck. In some embodiments, the handle is unitary with the neck. The neck is curved in a concave direction such that both ends of the neck 3a and 3b are pointed toward the same general direction. The shape of the neck allows the two blades to curve inwards, such that the handle 4, neck 3, and blades 1 and 2 are arranged in the shape of a half-circle. The tips 5 of the blades and the proximal end of the handle 4b are pointed in the same general direction. The neck also allows horizontal spacing 8 between the blades and the handle, so that there is room for a hand to grip the handle without coming into contact with the blades.

Figure 2:
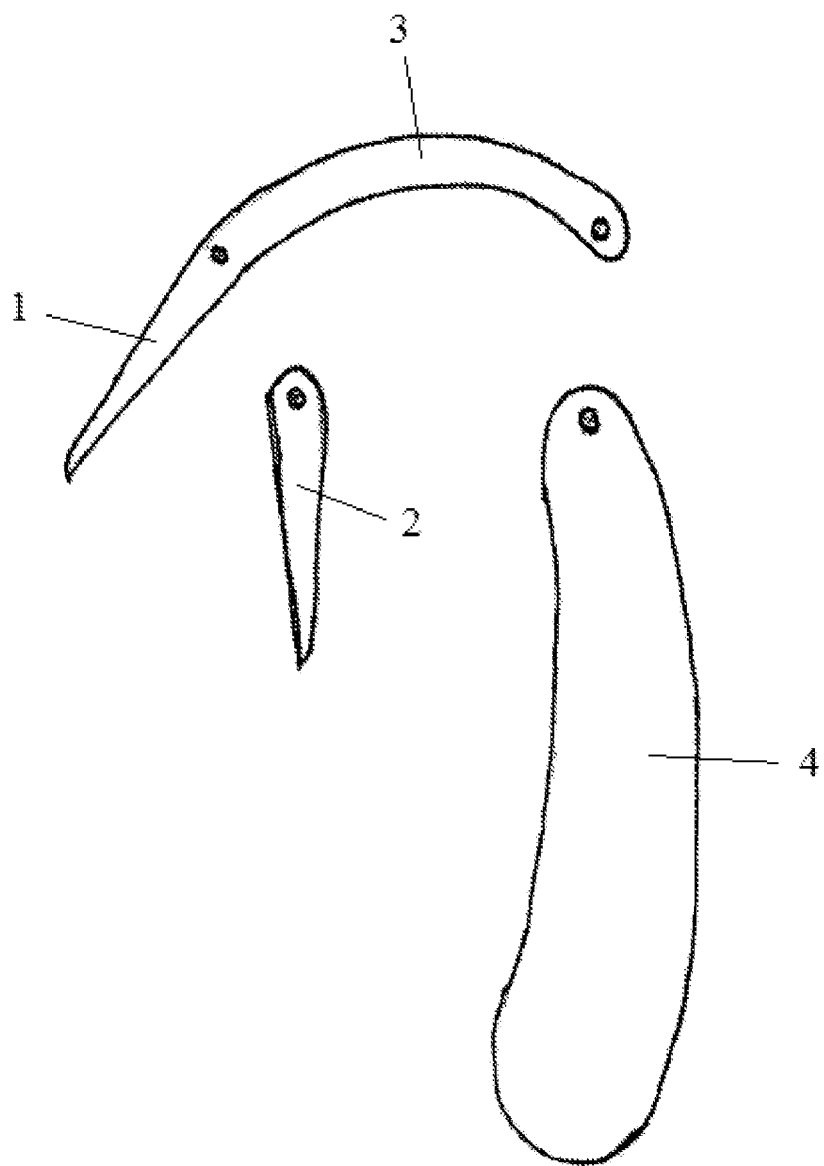
FIG. 2 shows the unassembled components of an exemplary grooming tool.

FIG. 2 shows an embodiment of the grooming tool with the two blades 1 and 2, neck 3, and handle 4 separated for purposes of illustration and clarity.

Figure 3:
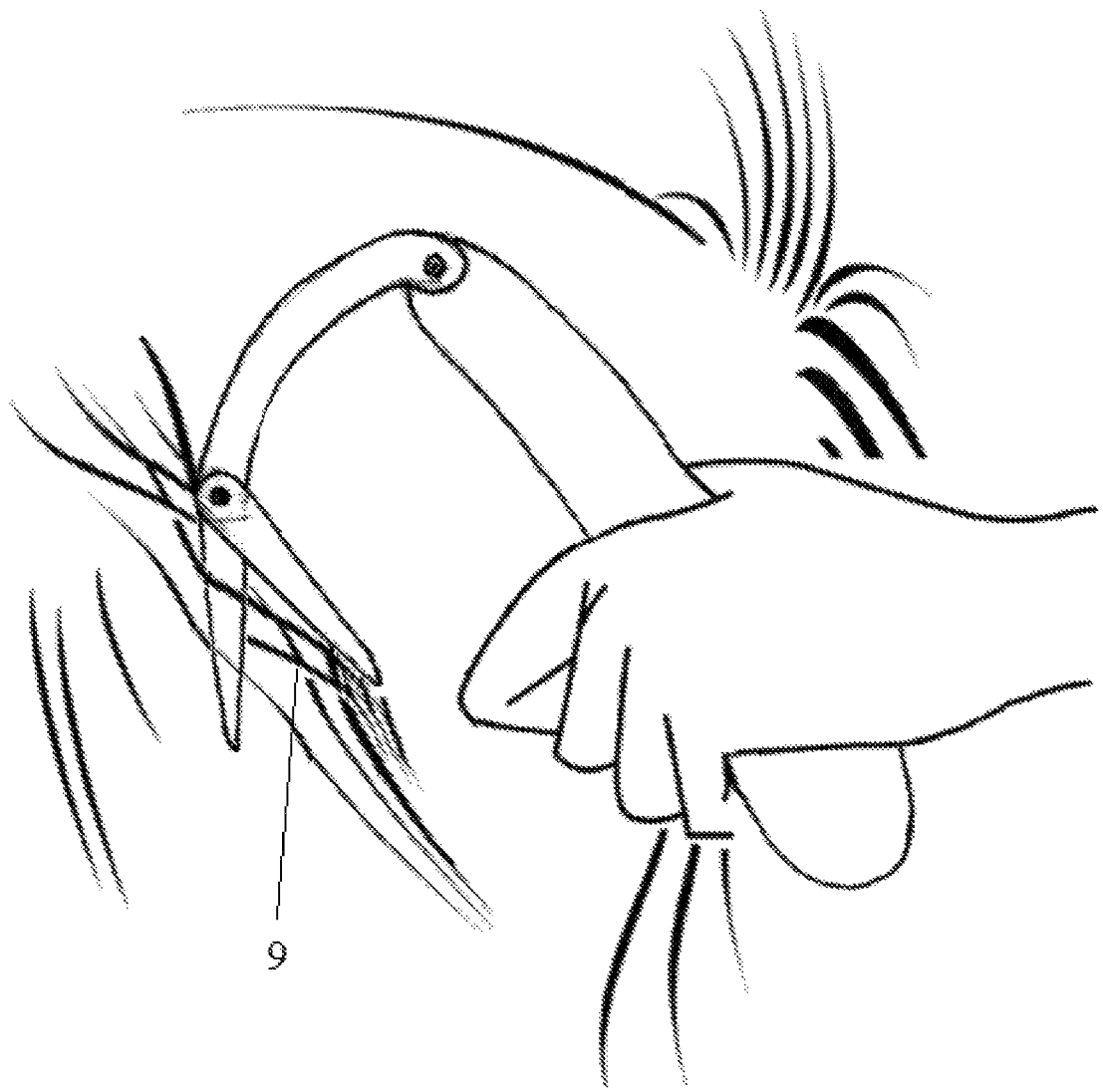
FIG. 3 shows the grooming tool in use for splitting a mat or tangle in an animal's fur or hair.

FIG. 3 shows an embodiment of the grooming tool that is in use for splitting a mat in the fur or hair of an animal, illustrating the gliding action of the blades. The fur mat 9 enters the space between the two blades 1 and 2. As the groomer moves the tool such that the mat enters the intersection of the two blades 1 and 2, the mat is sliced on two sides by the blades 1 and 2. The V-shape of the two blades 1 and 2 catches the fur mat 9 in a single gliding action that minimizes tugging or pulling on the animal. In some embodiments, the two blades are not arranged in a V-shape.

In some embodiments, the blades 1 and 2 are fastened together with sufficient force such that the blades 1 and 2 do not move with respect to each other when either one or both of the first or second blades slice through matted fur or hair. In some embodiments, blades 1 and 2 do not move with respect to each other during grooming. In some embodiments, neither blade 1 nor blade 2 moves with respect to the neck 3 or the handle 4 during grooming. In some embodiments, the angle between the two blades can be adjusted prior to grooming to optimize the tool for different fur types and densities.

In some embodiments, the first blade is unitary with the neck. In some embodiments, the neck is curved in a concave direction. In some embodiments, the first blade and the neck are two pieces that can be detached. In some embodiments, the handle is unitary with the body. In some embodiments, the handle and the body are two separate pieces.

In some embodiments, blade 1 and blade 2 are each between about 1 inch and about 3 inches in length, such as between about 1 inch and about 2.5 inches, between 1 inch and about 2 inches, between 1 inch and about 1.5 inches, between 1.5 inches and about 3 inches, between 1.5 inches and about 2.5 inches, between 1.5 inches and about 2 inches, between 2 inches and about 3 inches, between about 2 inches and about 2.5 inches, and between about 2.5 and about 3 inches. In some embodiments, blade 1 and blade 2 are each between about 1.5 and about 2.5 inches in length. In some embodiments, blade 1 and blade 2 are each between about 1.75 and about 2.25 inches in length. In some embodiments, blade 1 and blade 2 are each about 2 inches in length. In some embodiments, blade 1 and blade 2 are the same length. In other embodiments, blade 1 and blade 2 are different lengths.

In some embodiments, the neck has an arc length of between about 2 inches and about 6 inches, such as between about 2 inches and about 5.5 inches, between about 2 inches and about 5 inches, between about 2 inches and about 4.5 inches, between about 2 inches and about 4 inches, between about 2 inches and about 3.5 inches, between about 2 inches and about 3 inches, between about 2 inches and about 2.5 inches, between about 2.5 inches and about 6 inches, between about 2.5 inches and about 5.5 inches, between about 2.5 inches and about 5 inches, between about 2.5 inches and about 4.5 inches, between about 2.5 inches and about 4 inches, between about 2.5 inches and about 3.5 inches, between about 2.5 inches and about 3 inches, between about 3 inches and about 6 inches, between about 3 inches and about 5.5 inches, between about 3 inches and about 5 inches, between about 3 inches and about 4.5 inches, between about 3 inches and about 4 inches, between about 3 inches and about 3.5 inches, between about 3.5 inches and about 6 inches, between about 3.5 inches and about 5.5 inches, between about 3.5 inches and about 5 inches, between about 3.5 inches and about 4.5 inches, between about 3.5 inches and about 4 inches, between about 4 inches and about 6 inches, between about 4 inches and about 5.5 inches, between about 4 inches and about 5 inches, between about 4 inches and about 4.5 inches, between about 4.5 inches and about 6 inches, between about 4.5 inches and about 5.5 inches, between about 4.5 inches and about 5 inches, between about 5 inches and about 6 inches, between about 5 inches and about 5.5 inches, and between about 5.5 inches and about 6 inches. In some embodiments, the neck has an arc length of between about 2.5 inches and about 3.5 inches. In some embodiments, the neck has an arc length of about 3 inches. In some embodiments, the neck has an arc length of greater than about 2 inches, such as greater than about 2.5 inches, greater than about 3 inches, greater than about 4 inches, greater than about 5 inches, or greater than about 6 inches.

In some embodiments, the handle is between about 4 inches and about 10 inches in length, such as between about 4 inches and about 9 inches, between about 4 inches and about 8 inches, between about 4 inches and about 7 inches, between about 4 inches and about 6 inches, between about 4 inches and about 5 inches, between about 5 inches and about 10 inches in length, between about 5 inches and about 9 inches, between about 5 inches and about 8 inches, between about 5 inches and about 7 inches, between about 5 inches and about 6 inches, between about 6 inches and about 10 inches in length, between about 6 inches and about 9 inches, between about 6 inches and about 8 inches, between about 6 inches and about 7 inches, between about 7 inches and about 10 inches in length, between about 7 inches and about 9 inches, between about 7 inches and about 8 inches, between about 8 inches and about 10 inches in length, between about 8 inches and about 9 inches, and between about 9 inches and about 10 inches.

In some embodiments, the proximal end of the handle extends at least about 2 inches beyond the tips of the first and second blades, such as at least about 2.5 inches, at least about 3 inches, at least about 3.5 inches, or at least about 4 inches. In some embodiments, the proximal end of the handle extends at least about 3 inches beyond the tips of the first and second blades.

In some embodiments, the spacing between the blades and the handle is at least about 1.5 inches, such as at least about 2 inches, at least about 2.5 inches, at least about 3 inches, at least about 3.5 inches, at least about 4 inches, or at least about 5 inches.

In some embodiments, the body additionally comprises an attached pin brush for combing the fur or hair of the animal to be groomed. In some embodiments, the pin brush can be swiveled.

Variations and other embodiments are contemplated wherein the configuration of the tool varies somewhat from the illustrations in FIGS. 1-3.

The tool can comprise metal or other hard material suitable for fashioning a cutting surface. In some embodiments, the blades are made of a metal material such as steel, stainless steel, carbon steel, or any other material that are suitable for the blade of common scissor tools. In some embodiments, the grooming tool is made of one type of material, such as a metal material selected from steel, stainless steel, carbon steel, ceramic, or any other other material suitable for use in common scissors. In some embodiments, the grooming tool is made from hard ceramic or other non-metallic materials. In some embodiments, the neck and body of the grooming tool is made from a different material as the blade for example, plastics, rubbers or silicone materials which may offer an improved surface for the user to hold and grip on.

Portions of the tool that are made of metal material can be prepared by using standard metalworking tools and machinery, such as a drill press or a honing wheel. In some embodiments, the blade portion can be manufactured via a forging or sintering process. Portions of the tool that are made of plastic materials can be made via casting or molding, such as injection molding, or 3D printing.

In some embodiments, the handle is constructed in any shape that allows it to be attached to the neck and allows an ergonomic grip. In some embodiments, the handle of the tool is in an elongated shape. In some embodiments, the handle is made of a hard material, such as plastic, metal, or wood. In some embodiments, the handle is coated with a material that allows for easier grip and handling of the tool. In some embodiments, the handle is coated or overmolded with a silicone, rubber or elastomer material.

The blades can be sharpened with any commercially available sharpener for regular scissors. In some embodiments, the blades can be detachable from the tool to facilitate sharpening or replacement.

Figure 4:
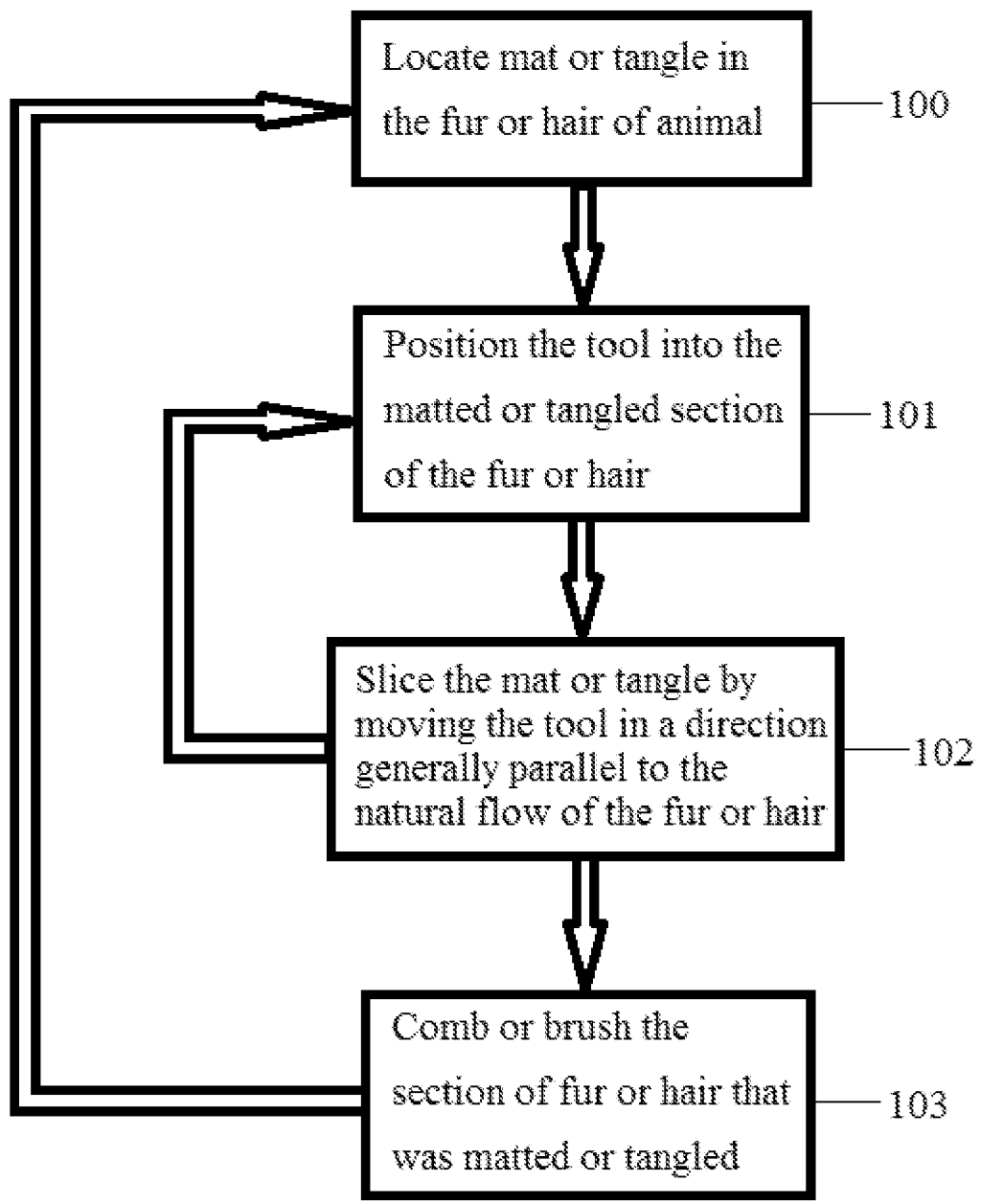
FIG. 4 shows a flow chart describing a method of grooming a pet at least partially using the mat splicing tool according to one embodiment described herein.

FIG. 4 shows a flow chart describing a method of grooming an animal having at least a partially matted coat with one or more mats or tangles using a double bladed grooming tool according to one embodiments described herein. The first step 100 is to locate the mat or tangle in the fur or the hair of animal. Next, the tool is positioned into the matted or tangled section of the fur or hair 101, such as shown in FIG. 3. The tool is then pulled in a direction generally parallel to the natural flow of the fur or hair to slice the mat or tangle 102. This is followed by combing or brushing the section of fur or hair that was matted or tangled 103. In some embodiments, steps 100, 101, 102, and 103 are repeated as necessary. Some embodiments of the method may include providing any of the animal grooming tools discussed herein.

In the above description of embodiments, reference is made to the accompanying drawings which form a part hereof, and in which specific embodiments that can be practiced are shown by way of example. Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims. It should be understood that the various embodiments have been presented by way of example only, and not by way of limitation. Likewise, the various diagrams may depict an example architectural or other configuration for the embodiments, which is done to aid in understanding the features and functionality that can be included in the disclosed embodiments. The disclosure is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can be applied alone, or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time.

But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements, or components of the invention may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

The invention claimed is:

1. An animal grooming tool, comprising:
   a handle having a proximal end and a distal end;
   a neck having a handle end and a blade end; and
   first and second blades each having a tip, a base, and an edge with a shearing surface, wherein
      the first and second blades are fastened together at their respective bases such that the shearing surfaces face one another,
      the bases of the first and second blades are attached to the blade end of the neck,
      the handle end of the neck is attached to the distal end of the handle, and wherein
      the first and second blades, the neck, and the handle are positioned such that the blades extend from base to tip in the same direction as the distal end to the proximal end of the handle;
   and wherein the neck is curved in a concave direction.

2. The tool of claim 1, wherein the first blade is unitary with the neck.

3. The tool of claim 1, wherein the tips of the first and second blades are rounded.

4. The tool of claim 1, wherein the first and second blades are fastened together to prevent relative movement when the blades are manually sliced through matted fur or hair.

5. The tool of claim 1, wherein the first and second blades are sharpened.

6. The tool of claim 1, wherein the first and second blades are positioned at an angle that is less than 90 degrees relative to one another.

7. The tool of claim 1, wherein the handle is unitary with the neck.

8. The tool of claim 1, wherein the first and second blades are each between about 1.5 and about 2.5 inches in length.

9. The tool of claim 1, wherein the neck has an arc length of greater than about 2 inches.

10. The tool of claim 1, wherein the handle is between about 4 inches and about 10 inches in length.

11. A method of grooming an animal having at least a partially matted coat with one or more mats or tangles using the tool of claim 1, the method comprising:
    locating the one or more mats or tangles;
    slicing the one or more mats or tangles by moving the tool in a direction generally parallel to the natural flow of the fur in the matted or tangled section; and
    combing the remaining hair.

12. The method of claim 11, wherein the mat or tangle to be removed is received between the first and second blades of the tool.

13. The method of claim 11, wherein the slicing step comprises contacting both shearing surfaces of the first and second blades with the mat or tangle.

14. The method of claim 13, wherein contacting both shearing surfaces of the first and second blades with the mat or tangle in the slicing step creates substantially less pulling force than contacting the shearing surface of only one blade.

15. The method of claim 11, wherein the animal is a dog, a cat, or a rabbit.

* * * * *